United States Patent [19]

Prueter

[11] Patent Number: 4,568,109
[45] Date of Patent: Feb. 4, 1986

[54] PIPE ALIGNING AND JOINING

[75] Inventor: Elton D. Prueter, Saginaw, Mich.

[73] Assignee: The Dow Chemical Company, Midland, Mich.

[21] Appl. No.: 466,450

[22] Filed: Feb. 15, 1983

[51] Int. Cl.[4] ............................................. F16L 35/00
[52] U.S. Cl. ........................................ 285/24; 285/55; 285/91; 285/367; 285/408; 285/DIG. 16; 29/464
[58] Field of Search .................... 285/367, 24, 55, 367, 285/DIG. 16, 91, 408; 29/464

[56] References Cited

U.S. PATENT DOCUMENTS

| 1,607,943 | 11/1926 | Carson et al. ................... 285/367 X |
| 3,284,107 | 11/1966 | West ...................................... 285/55 |
| 3,284,108 | 11/1966 | West . |
| 3,335,484 | 8/1967 | Parker et al. . |
| 3,383,750 | 5/1968 | Schroeder et al. . |
| 3,390,442 | 7/1968 | Sosnowski et al. . |
| 3,448,491 | 6/1969 | Sosnowski et al. . |
| 3,461,505 | 8/1969 | Schroeder et al. . |
| 3,650,550 | 3/1972 | West . |
| 3,742,590 | 7/1973 | Douglas . |

FOREIGN PATENT DOCUMENTS

| 1028377 | 3/1978 | Canada ................................ 285/367 |
| 19895 | 12/1980 | European Pat. Off. ............ 285/367 |
| 2807893 | 8/1974 | Fed. Rep. of Germany ...... 285/367 |
| 284843 | 2/1928 | United Kingdom ................ 285/367 |
| 610441 | 10/1948 | United Kingdom ................ 285/367 |

Primary Examiner—Dave W. Arola
Attorney, Agent, or Firm—R. B. Ingraham

[57] ABSTRACT

At least one pressure deformable insert is provided in a split ring "V" clamp for flanged plastic lined pipe to aid in alignment of piping elements being joined.

11 Claims, 9 Drawing Figures

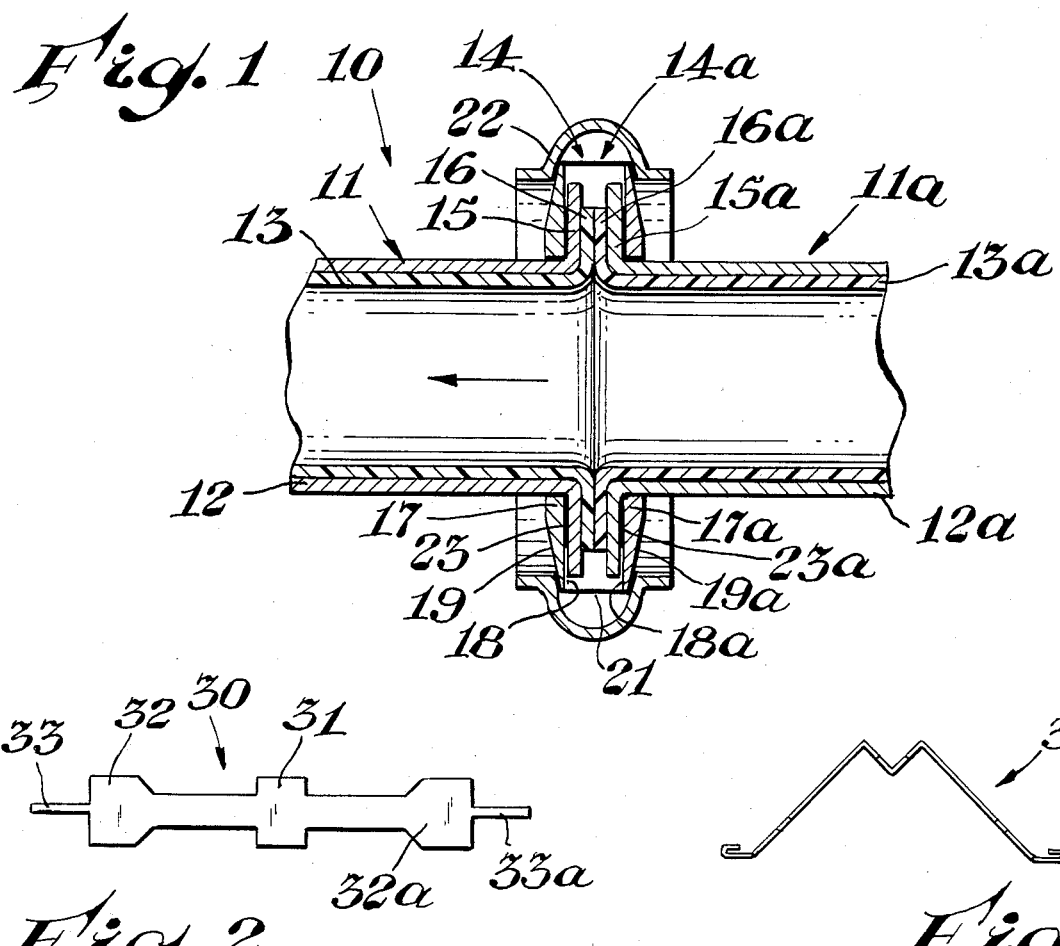
Fig. 1
Fig. 2
Fig. 3
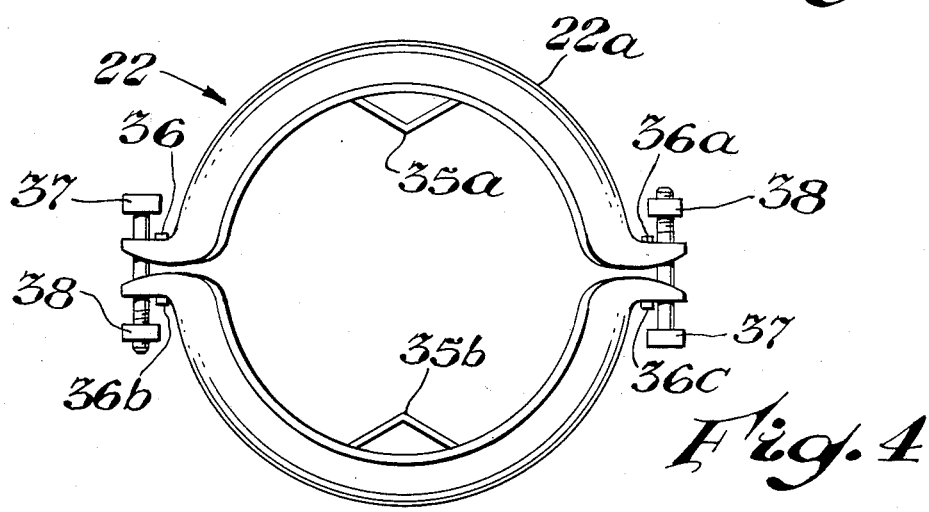
Fig. 4
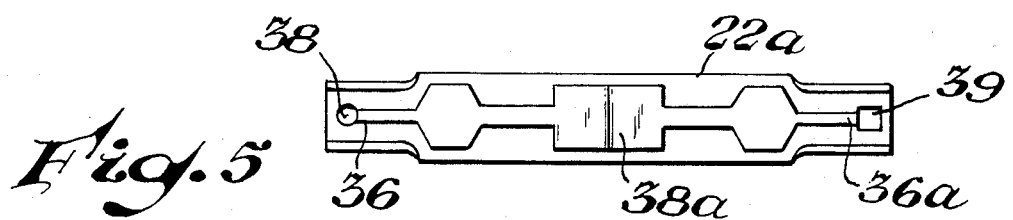
Fig. 5

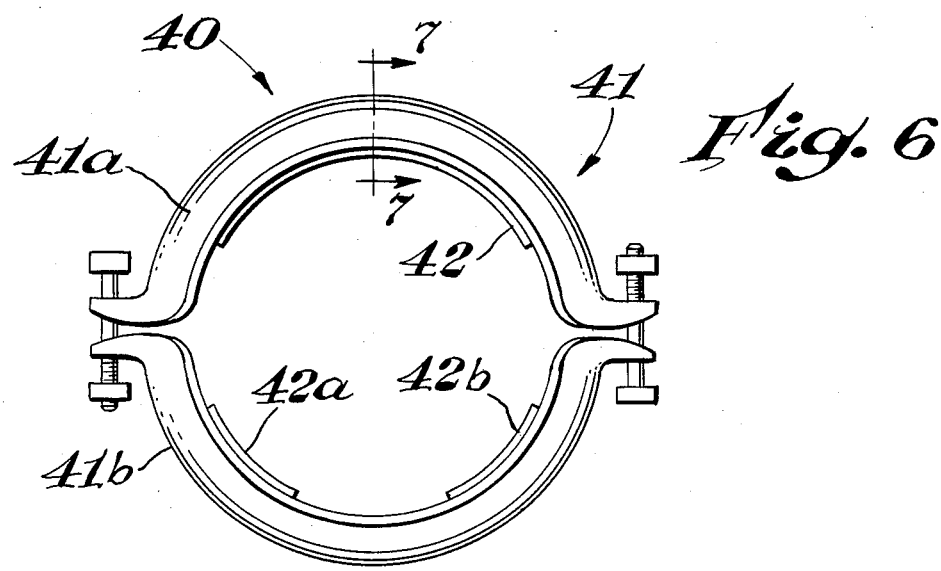
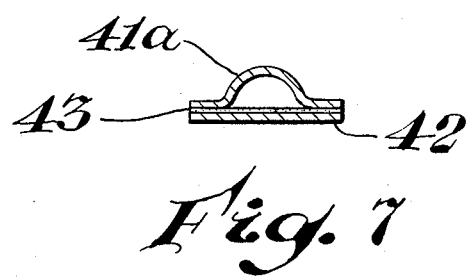
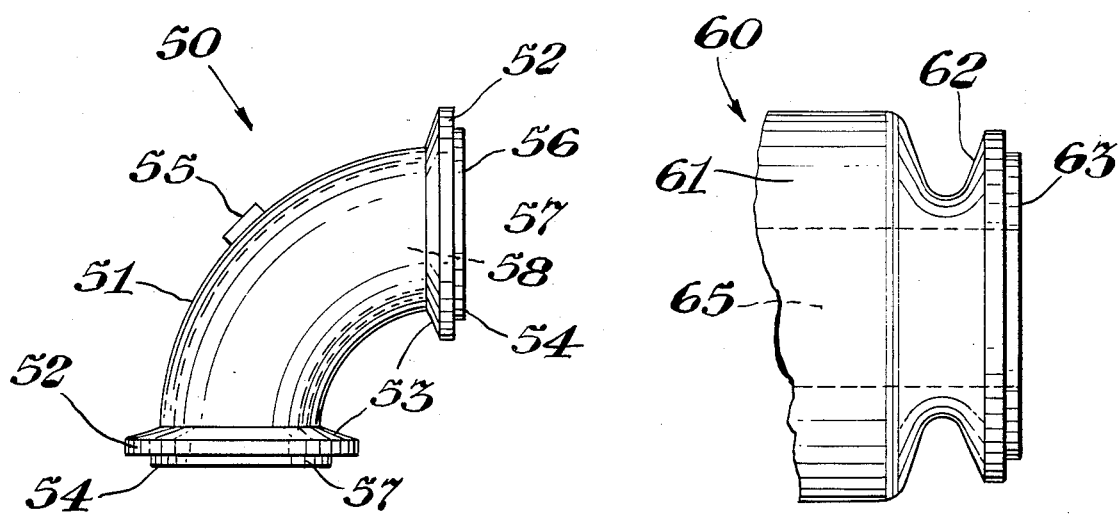

PIPE ALIGNING AND JOINING

For many years pipe and like conduit has been employed to transport liquids of varying corrosive nature. Oftentimes materials which provide the desired resistance to corrosion do not provide adequate physical properties to resist the stresses normally applied to a pipe or similar conduit. Therefore, two-layer conduits have been employed wherein a corrosion resistant lining is applied to a conduit having the desired physical resistance, for example, rubber lined steel or wood lined steel pipe. Of considerable commercial importance are plastic lined steel pipes. Some such lined pipe is lined with a thermoset resin while others are lined with thermoplastic resins. For many applications a particularly desirable combination is a thermoplastic liner of substantial thickness; for example, in 2 inch nominal pipe a liner may be as thick as 5 millimeters while the pipe wall may be on the order of 3.5 millimeters in thickness. Such lined pipe provides excellent service. However, it is relatively heavy, cumbersome to handle when used in situations where frequent disassembly is required. Further, a wide variety of joints is prepared by removing a terminal portion of the pipe, applying a flange to the pipe and subsequently flanging the protruding liner to conform to the flange. Such techniques are disclosed in U.S. Pat. Nos. 3,335,484; 3,383,750; 3,390,442; 3,448,491; 3,461,505; 3,650,550. Means of joining such pipes are disclosed in U.S. Pat. Nos. 3,284,107 and 3,284,108. Light weight plastic lined pipe is disclosed in U.S. Pat. No. 3,742,590. A particularly convenient means of flaring both pipe and liner simultaneously is disclosed in U.S. Pat. No. 3,744,115.

A particularly desirable joint for the assembly of light weight plastic lined, or light schedule plastic lined pipe as it is sometimes known, is set forth in U.S. Pat. No. 4,313,625, wherein a split "V" clamp engages loose rings disposed behind adjacent pipe flanges by tightening the split ring "V" clamp flanges and the plastic liners are brought into sealing engagement. Oftentimes in the assembly of such lined conduit employing split ring "V" clamps in the field, alignment of the conduit ends at times is accomplished only with difficulty and may require temporary shimming or like temporary supports to obtain the desired alignment prior to application of a split ring "V" clamp.

It would be desirable if there were available an improved split ring "V" clamp which would aid in the alignment of adjacent flanged conduit ends.

It would also be desirable if there were available an improved split ring "V" clamp suitable for the preparation of the assembly of plastic lined pipe which would aid in the alignment of adjacent flanged ends of such pipe.

It would also be desirable if there were available an improved method for the assembly of flanged lined pipe alignments which minimized the problem of aligning ends prior to the application of a split ring "V" clamp.

These benefits and other advantages in accordance with the present invention are provided in an improved split ring "V" clamp, the split ring "V" clamp comprising at least first and second "V" clamp ring portions, the ring portions on assembly in clamping configuration defining a generally circular configuration, the circular configuration having a generally inwardly facing tapering annular groove adapted to receive flange members and as the portions of the split ring "V" clamp are drawn together to thereby force flange members toward each other and provide a desired connection between adjacent conduit member ends, the improvement which comprises providing a pressure deformable insert generally adjacent a flange engaging portion of the inwardly facing annular groove to provide in at least each portion of the split ring "V" clamp an axially extending region extending across the annular groove wherein the split ring "V" clamp in the assembled configuration defines at least 3 generally opposed axially extending regions of contact with flanges of conduits to be joined disposed within the split ring "V" clamp.

Also contemplated within the scope of the present invention is a method for the assembly of conduit end portions wherein a split ring "V" clamp is disposed generally coaxially with the conduit ends, the split ring "V" clamp defining an inwardly facing annular channel wherein all opposing portions of said channel are adapted to engage flanges disposed on internal portions of the conduit members to thereby force said internal portions together to form a pipe joint, disposing within the split ring "V" clamp a deformable insert which provides at least three generally opposed axially extending regions of contact with flanges of conduits joined drawing the portions of the split ring "V" clamp together to thereby initially align the flanges on the terminal portions of the conduit and deform the deformable insert on further drawing of the split ring "V" clamp members together to thereby provide a conduit joint.

Also contemplated within the scope of the present invention is an improved pipe joint, the pipe joint comprising at least a first plastic lined conduit having a synthetic resinous pressure deformable liner disposed within a pressure deformable metal conduit, the first plastic lined conduit having at least one end, the conduit end defining a radially outwardly projecting flange composed of deformed metal of the metal conduit and deformed plastic of the liner, a loose ring having a generally planar face is disposed about the conduit against the metal flange, the loose ring having a tapering face remote from the metal flange, the tapering face tapering outwardly toward a periphery of the metal flange, a split "V" clamp disposed about the loose ring and an opposed surface of generally like configuration, the split ring "V" clamp having disposed therein a deformable insert, the deformable insert providing at least three generally opposed axially extending regions of contact with a cylinder, axially disposed within the split ring "V" clamp wherein the diameter of the cylinder approximates the inner diameter of the split ring "V" clamp when assembled in clamping configuration; the split ring "V" clamp clamping a deformed deformable liner between at least a portion of the opposing loose rings, the split ring "V" clamp thereby forcing the plastic liner against an opposed sealing face.

A preferred species of the present invention adheres the loose ring to the adjacent conduit flange.

Further features and advantages of the present invention will become more apparent from the following specification taken in connection with the drawing wherein FIG. 1 schematically depicts a sectional view of a joint in accordance with the present invention between two plastic lined conduits;

FIG. 2 shows a plan view of one variety of pressure deformable insert suitable for the practice of the present invention;

FIG. 3 depicts an edge view of the insert of FIG. 1 in a configuration suited to be added to a split ring "V" clamp;

FIG. 4 depicts a split ring "V" clamp having disposed therein insert means in accordance with the invention;

FIG. 5 is a representation of an insert portion disposed within one-half of a split ring "V" clamp;

FIG. 6 is an end view of a split ring "V" clamp assembly in accordance with the invention;

FIG. 7 is a sectional view through line 7—7 FIG. 6;

FIG. 8 depicts an elbow suitable for the practice of the present invention; and

FIG. 9 is a fractional view of one flange of a lined valve for use in the present invention.

In FIG. 1 there is depicted a conduit joint in accordance with the present invention generally designated by numeral 10. The conduit joint comprises a first conduit 11 and a second conduit 11a of like construction. The conduit 11 has a generally hollow cylindrical metal body 12 having disposed therein a hollow deformable plastic liner 13. The conduit 11 terminates in a flange generally designated by the reference numeral 14. Flange 14 is generally radially outwardly extending and comprises a first or metal portion 15 and a sealing or plastic liner portion 16 which is in engagement with a like flange portion 16a. Loose rings 17 and 17a are disposed about the conduits 11 and 11a respectively. The loose ring 17 has a generally planar radially extending face 18 disposed immediately adjacent the flange 14. The loose ring 17 has a tapering face 19 which tapers toward the flange 14 and is disposed remote therefrom. Conduit 11a is of similar construction wherein like components are designated by like reference numerals having the suffix "a". A deformable liner 21 is disposed between the loose ring 17 and 17a and split "V" ring clamp 22 engages the deformable liner 21, which in turn engages the split ring "V" clamp 22 and forces the tapering faces 19 and 19a and the flange portion 16 and 16a into sealing engagement. Optionally, adhesive portions 23 and 23a serve to adhere the loose rings 17 and 17a to their associated flange portions 15 and 15a. Such adhesive is employed primarily for purposes of assembly to maintain the loose rings 17 and 17a in a desired position during the application of the split ring "V" clamp 22. Any of a wide variety of adhesive materials may be utilized including epoxy resins and putty. Any of a wide variety of caulking materials may be utilized including butyl rubber caulking, silicone rubber caulking and the like.

In FIG. 2 there is schematically depicted a plan view of a blank 30 useful in the preparation of joints in accordance with the present invention and for the practice of the method thereof. The blank 30 is of generally planar elongate configuration and has a generally broadened central region 31 disposed generally centrally with respect to the elongate blank. Broadened terminal portions of about equal width 32 and 32a are disposed adjacent ends of the blank 30, each of the broadened end portions 32 and 32a terminating in a narrow tongue 33 and 33a respectively. Deformable insert blanks such as the blank 30 may be prepared from a wide variety of generally plastically deformable materials which include metals, plastics and paper.

A blank such as the blank 30 is generally deformed to a configuration such as the configuration 35 depicted in FIG. 3, by folding along the dotted lines indicated in FIG. 2. The configuration shown in FIG. 3 is the configuration of a formed blank such as 35 to provide one-half of the deformable liner for split "V" clamp such as the clamp 22 of FIG. 1. The formed blank has a generally "M" shaped configuration.

Referring to FIG. 4, there is depicted a split "V" clamp 22 having a first portion 22a and a second portion 22b; the portions 22a and 22b are of generally like configuration and have disposed therein pressure deformable liners 35a and 35b respectively. The narrow terminal portions or tongues 33 and 33a of the liner pass through bolt holes, not shown, of the clamp portions 22a and 22b respectively. The narrow terminal portions are designated by the reference numeral 36 and 36a for the plastically deformable liner 35a and 36b, and 36c for the deformable liner portion 35b. Terminal ends of the clamp portions 22a and 22b have openings, not shown, through which pass bolts 37 having associated nuts 38.

In FIG. 5 there is depicted a view of split ring "V" clamp half 22a having the deformable liner 35a disposed therein showing the liner ends 36 and 36a passing through bolt holes 38 and 39 formed in the terminal portions of the split ring half 22a.

In FIG. 6 there is depicted a clamp assembly generally designated by the reference numeral 40. The clamp assembly 40 comprises a split ring "V" clamp 41 with associated bolts. On the inner surface of the split ring "V" clamp is disposed an adherent tape 42 which extends almost the entire length of one-half of the split "V" clamp designated 41a. A second portion of the clamp 41 designated by the reference numeral 41b has disposed on the inner surface thereof a first short section of deformable adhesive tape 42a and spaced therefrom also on the inner surface a second short section of tape 42b. The clamp 42 for most of its periphery has a configuration as depicted in FIG. 7 which shows a sectional view taken along the line 7—7 of FIG. 6, showing the cross sectional configuration of clamp portion 41a, a deformable metal tape 42 adhered to the clamp portion 41a by an adhesive layer 43. Beneficially the adhesive layer 43 may be any one of a wide number of pressure sensitive adhesives such as rubber cement, silicon caulking, tar and the like. Alternatively, if a more permanent adhesive is employed which is less pressure sensitive, a copolymer of about 90 weight percent ethylene and 10 weight percent acrylic acid may be utilized and the tape applied by heating and subsequent cooling.

FIG. 8 depicts a plastic lined fitting suitable for the present invention and generally designated by the reference numeral 50. The fitting 50 as shown in FIG. 8 is a 90-degree elbow having an outer housing 51 of metal, advantageously cast steel, or the like. At both ends of the fitting 50 are disposed like flanges 52. The flanges 52 advantageously are cast integral with the body 51. The flanges 52 have a first or tapering face 53. The faces 53 thin as their diameter increases away from the body 51. The flanges 52 have generally planar radially extending faces 54 remote from the faces 53. The body 51 defines an indexing tab 55 which merely is a reference projection conveniently used when the housing 51 is provided with a plastic liner 56. The plastic liner 56 covers the entire internal surface of the body 51 and a major portion of the surface 54 of the body 51 with plastic flange portions 57. The liner 56 defines an internal passageway 58 providing full communication from one end of the elbow to the other.

Other fittings such as tees and Y's, crosses, reducers, blind flanges, caps and the like are readily prepared for use with the present invention. The tapering flange configuration is readily employed with such a variety of fittings. Valves for use with the present invention beneficially are prepared from conventional flanged valves where the conventional flange is turned or milled to a configuration such as depicted in FIG. 9.

In FIG. 9 there is depicted a fractional view of a valve for use with the present invention, the valve being generally designated by the reference numeral 60, the valve having a body portion 61, a flange portion 62 and a plastic liner portion 63; the configuration of the flange 62 being generally identical to the flange 52 of the fitting of FIG. 8 and the liner portion being generally identical to the flanges 57 of FIG. 8. Valve 60 has defined therein a fluid passage 65.

The use of the deformable liners alone or in combination with the adhered loose rings provides a piping system which is particularly conveniently assembled in that when it is attempted to apply a split "V" clamp, the deformable liner or liner portions within the "V" clamp tend to align the loose rings and subsequently the ends of the conduit members being joined, thus significantly reducing the labor and time required for preparing joint assemblies while retraining all of the convenience of the pipe joint of U.S. Pat. No. 4,313,625.

Piping systems prepared in accordance with the present invention are particularly convenient for assembly as there are no fixed bolted flanges, and any element in the system may be rotated to any desired degree and readily clamped in sealing relationship. The present invention provides joints of remarkable desirability when subjected to heating and cooling cycles. Tightening of the joints is not required as frequently with thermoplastic lines as employed in more rigid systems. It is believed that the split ring conduit flanges of the split "V" clamp provide a degree of resiliency which tends to reduce cold flow of the liner flange while maintaining reliable sealing pressure. Joints in accordance with the present invention show excellent load bearing properties particularly when placed under loads which are coaxial with the conduits. Such joints whether conduit-to-conduit or conduit-to-fitting are satisfactory for services to 150 pounds per square inch when a Schedule 10 steel conduit is employed with a plastic lining having a thickness of 1/16 of an inch.

As is apparent from the foregoing specification, the present invention is susceptible of being embodied with various alterations and modifications which may differ particularly from those that have been described in the preceeding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In an improved split ring "V" clamp, which can initially align flanges of conduits to be joined, the split ring "V" clamp comprising at least first and second "V" clamp ring portions, the ring portions on assembly in clamping configuration defining a generally circular configuration, the circular configuration having a generally inwardly facing tapering annular groove adapted to receive flange members, and as the portions of the split ring "V" clamp are drawn together by means of bolts and nuts to thereby force flange members toward each other and provide a desired connection between adjacent conduit member ends, the improvement which comprises providing a pressure deformable insert prepared from at least two generally planar elongate blanks, the insert being generally adjacent a flange engaging portion of the inwardly facing annular groove to provide in at least each portion of the split ring "V" clamp an axially extending region extending across the annular groove wherein the split ring "V" clamp in the assembled configuration defines at least 3 generally opposed axially extending regions of contact with flanges of conduits to be joined disposed within the split ring "V" clamp, with the further limitation that on drawing the split ring "V" clamp members together about flange members, the deformable insert is deformed into the tapering annular groove.

2. The "V" clamp of claim 1 wherein the deformable insert is metal.

3. The "V" clamp of claim 1 wherein the deformable insert is of metal and comprises two generally M shaped members.

4. The "V" clamp of claim 3 wherein the M shaped members define narrow terminal portions which pass through bolt holes of the "V" clamp portions.

5. The "V" clamp of claim 1 wherein the deformable insert is a tape.

6. A method for the assembly of conduit end portions wherein a split ring "V" clamp is disposed generally coaxially with the conduit ends, the split ring "V" clamp defining an inwardly facing annular channel wherein all opposing portions of said channel are adapted to engage flanges disposed on internal portions of the conduit members to thereby force said internal portions together to form a pipe joint, disposing within the split ring "V" clamp a deformable insert prepared from at least two generally planar elongate blanks, the insert providing at least three generally opposed axially extending regions of contact with flanges of conduits joined, drawing the portions of the split ring "V" clamp together by means of bolts and nuts to thereby initially align the flanges on the terminal portions of the conduit and deform the deformable insert on further drawing of the split ring "V" clamp members together to thereby provide a conduit joint.

7. The method of claim 6 wherein the deformable insert is metal.

8. The method of claim 6 wherein the deformable insert is of metal and comprises two generally M shaped members.

9. The method of claim 6 wherein the M shaped members define narrow terminal portions which pass through bolt holes of the "V" clamp portions.

10. The method of claim 6 wherein the deformable insert is a tape.

11. An improved pipe joint, the pipe joint comprising at least a first plastic lined conduit having a synthetic resinous pressure deformable liner disposed within a pressure deformable metal conduit, the first plastic lined conduit having at least one end, the conduit end defining a radially outwardly projecting flange composed of deformed metal of the metal conduit and deformed plastic of the liner, a loose ring having a generally planar face is disposed about the conduit against the metal flange, the loose ring having a tapering face remote from the metal flange, the tapering face tapering outwardly toward a periphery of the metal flange, a split "V" clamp disposed about the loose ring and an opposed surface of generally like configuration, the split ring "V" clamp having disposed therein a deformable insert, the deformable insert providing at least three generally opposed axially extending regions which can contact the loose rings, axially disposed within the split ring "V" clamp wherein the diameter of loose rings approximates the inner diameter of the split ring "V" clamp when assembled by means of nuts and bolts in clamping configuration; the split ring "V" clamp clamping a deformed deformable liner between at least a portion of the opposed loose rings, the split ring "V" clamp thereby forcing the plastic liner against an opposed sealing face.

* * * * *